(12) United States Patent
Pan et al.

(10) Patent No.: US 9,204,470 B2
(45) Date of Patent: Dec. 1, 2015

(54) METHOD FOR A WIRELESS TARGET DEVICE TO AUTOMATICALLY CONNECT TO A TARGET NETWORK, WIRELESS NETWORK SYSTEM WITH AUTOMATIC NETWORK SETTING ABILITY, AND WIRELESS TARGET DEVICE THEREOF

(71) Applicants: LITE-ON ELECTRONICS (GUANGZHOU) LIMITED, Guangzhou (CN); LITE-ON TECHNOLOGY CORP., Taipei (TW)

(72) Inventors: Chih-Li Pan, Taipei (TW); Heng-Yi Lin, Taipei (TW); Chih-Yen Wu, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 91 days.

(21) Appl. No.: 13/958,752

(22) Filed: Aug. 5, 2013

(65) Prior Publication Data

US 2014/0064198 A1    Mar. 6, 2014

(30) Foreign Application Priority Data

Aug. 30, 2012    (CN) .......................... 2012 1 0314343

(51) Int. Cl.
*H04L 1/00*     (2006.01)
*H04W 76/02*    (2009.01)
*H04W 84/18*    (2009.01)

(52) U.S. Cl.
CPC .............. *H04W 76/02* (2013.01); *H04W 84/18* (2013.01)

(58) Field of Classification Search
CPC ..... H04W 72/04; H04W 72/05; H04W 72/06; H04L 65/00; H04L 65/01; H04L 65/02; H04L 65/03
USPC .......................... 370/329, 338, 341, 351–356
See application file for complete search history.

(56) References Cited

U.S. PATENT DOCUMENTS

2007/0171910 A1*   7/2007   Kumar .......................... 370/392

* cited by examiner

*Primary Examiner* — Dady Chery
(74) *Attorney, Agent, or Firm* — Rosenberg, Klein & Lee

(57) ABSTRACT

A method is for allowing a wireless target device to automatically connect to a target network. The method is to be implemented by a wireless executing device in a wireless network system. In the method, the wireless executing device is configured to establish an ad-hoc wireless network with the wireless target device, and to transmit an access setting to the wireless target device over the ad-hoc wireless network. The access setting enables the wireless target device to connect to the target network automatically.

16 Claims, 6 Drawing Sheets

METHOD FOR A WIRELESS TARGET DEVICE TO AUTOMATICALLY CONNECT TO A TARGET NETWORK, WIRELESS NETWORK SYSTEM WITH AUTOMATIC NETWORK SETTING ABILITY, AND WIRELESS TARGET DEVICE THEREOF

CROSS-REFERENCE TO RELATED APPLICATION

This application claims priority of Chinese Application No. 201210314343.6, filed on Aug. 30, 2012.

BACKGROUND OF THE INVENTION

1. Field of the Invention

The invention relates to a wireless network system and a method for wireless network connection, more particularly to a wireless network system with automatic network setting capability, and a method for allowing a wireless target device of the wireless network system to automatically connect to a target network.

2. Description of the Related Art

Wireless network technology has been thriving and has become an important part of modern society. A wireless device is provided with a wireless network transceiver, which is configured to search a signal broadcasted by a wireless service providing device. After the signal is received, the wireless device is then able to enter a wireless setting procedure for connecting to a wireless network provided by the wireless service providing device.

For security reasons, most wireless networks require authentication from the wireless device before granting access to the same. For example, a security key that is associated with a specific wireless network, identified by a unique service set identifier (SSID), may be required. Conventionally, the wireless device is further provided with an input interface (e.g., a keyboard and/or a touch screen) that allows a user to manually input the required security key associated with the unique SSID.

However, a number of types of the wireless devices such as a wireless speaker, a wireless illuminating device and a wireless network bridging device, do not require such an input interface to operate, aside from receiving the security key for wireless network connection. As a result, is not cost-effective to incorporate the otherwise occasionally used input interface into the wireless device.

SUMMARY OF THE INVENTION

Therefore, one object of the present invention is to provide a method for allowing a wireless target device to automatically connect to a target network.

Accordingly, a method of the present invention is to be implemented by a wireless executing device and comprises the following steps of:

establishing, by the wireless executing device, an ad-hoc wireless network with the wireless target device; and transmitting, by the wireless executing device, an access setting to the wireless target device over the ad-hoc wireless network, the access setting enabling the wireless target device to connect to the target network.

Another object of the present invention is to provide a wireless network system with automatic network setting capability.

Accordingly, a wireless network system of the present invention comprises a wireless service providing device, a wireless executing device and a wireless target device.

The wireless service providing device is for providing access to a target network. The wireless executing device is operable to connect to the target network, and to establish an ad-hoc wireless network with the wireless target device. The wireless executing device is configured to transmit an access setting to the wireless target device over the ad-hoc wireless network. The access setting enables the wireless target device to automatically connect to the target network.

Yet another object of the present invention is to provide a wireless target device for use in the aforesaid wireless network system with automatic network setting capability.

Accordingly, the wireless network system includes the wireless target device, a wireless service providing device for providing access to a target network, and a wireless executing device that is operable to connect to the target network. The wireless target device of the present invention comprises a transceiver unit for receiving an access setting wirelessly transmitted by the wireless executing device, and a connecting unit configured to connect to the target network using the access setting received from the wireless executing device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
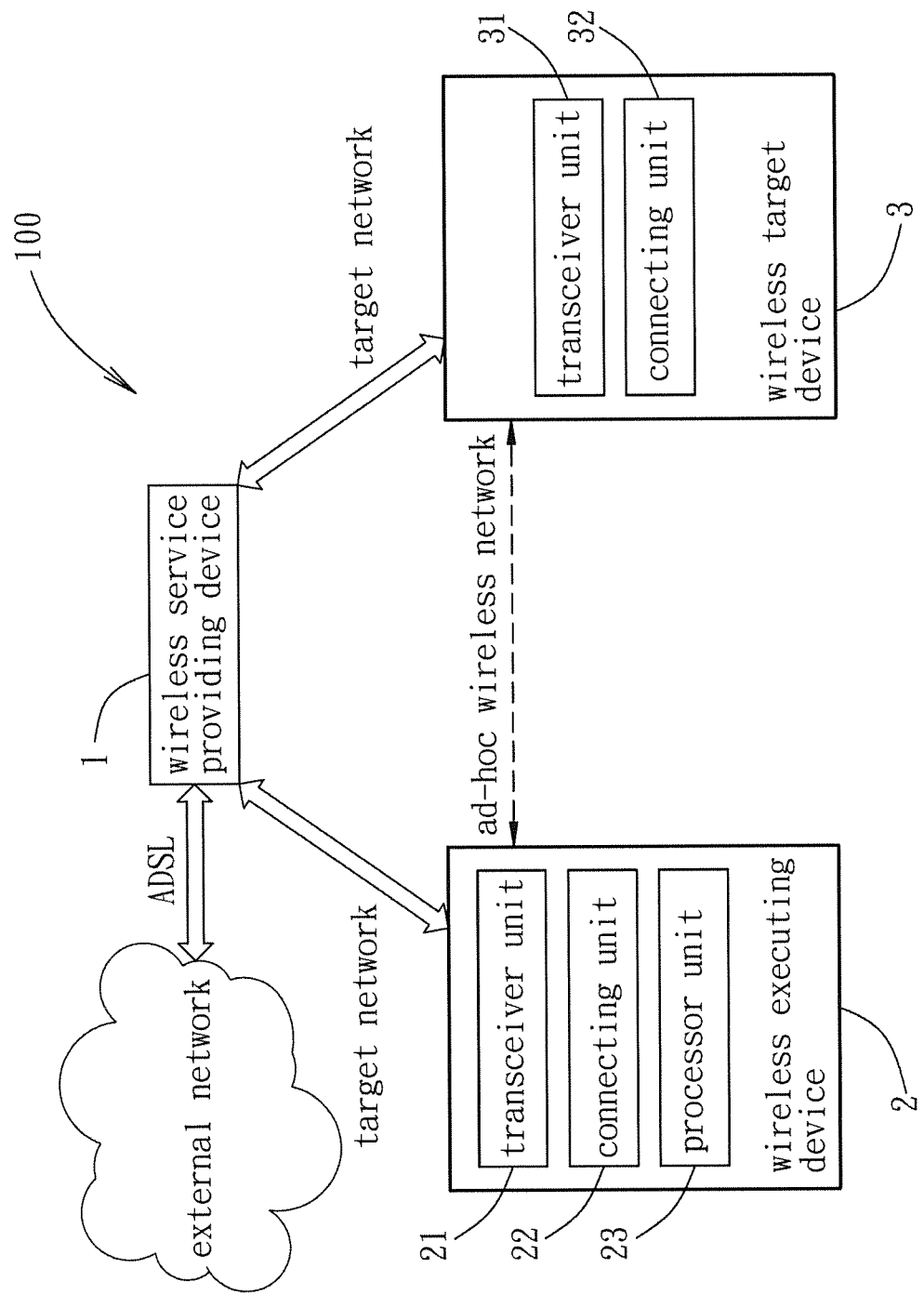
FIG. 1 is a schematic block diagram of a wireless network system according to a first preferred embodiment of the present invention.

Before the present invention is described in greater detail, it should be noted that like elements are denoted by the same reference numerals throughout the disclosure.

As shown in FIG. 1, the first preferred embodiment of a wireless network system 100 according to the present invention comprises a wireless service providing device 1, a wireless executing device 2 and a wireless target device 3.

In this embodiment, the wireless service providing device 1 may be, for example, a wireless sharing device, a wireless gateway, a wireless access point (WAP), a wireless router, a wireless switch, or any other devices that provide similar functionalities. The wireless executing device 2 may be a mobile phone, a portable computer or the like. The wireless target device 3 may be a wireless network connector, a wireless speaker or the like, and does not include an input interface for receiving user-input data in order to enter a wireless setting procedure for connecting to a wireless network. That is, the wireless target device 3 is not capable of connecting to the external network directly. The wireless service providing device 1 is connected to an external network and is configured to provide a target network, to which the wireless service providing device 1 is also connected. The wireless executing device 2 is operable to connect to the target network. The wireless executing device 2 and the wireless target device 3 are configured to establish a wireless network therebetween.

Preferably, the external network is the Internet, and the target network is a wireless network that conforms to wireless fidelity (Wi-Fi) certification. The wireless service providing device 1 is a Wi-Fi access point, and the wireless executing device 2 is a mobile phone configured to have Wi-Fi transceiving functionality. The wireless target device 3 is a wireless speaker having Wi-Fi transceiving functionality but without an input interface, and therefore is not capable of connecting to the Internet directly. The wireless network between the wireless executing device 2 and the wireless target device 3 is an ad-hoc wireless network or the like. As used herein, the term "ad-hoc wireless network" refers to a wireless network among multiple devices that use an identical service set identifier (SSID) and a specific service channel to transmit data thereamong over a short range. The ad-hoc wireless network generally consumes lower power, and has a relatively simpler infrastructure for the multiple devices to wirelessly transmit data thereamong. The wireless service providing device 1 is able to access the Internet using asymmetric digital subscriber line (ADSL) technology or the like. It is noted that the target network may also be a wireless network using Bluetooth technology, and the wireless service providing device 1, the wireless executing device 2 and the wireless target device 3 may also be configured to have Bluetooth transceiving functionality.

Figure 2:
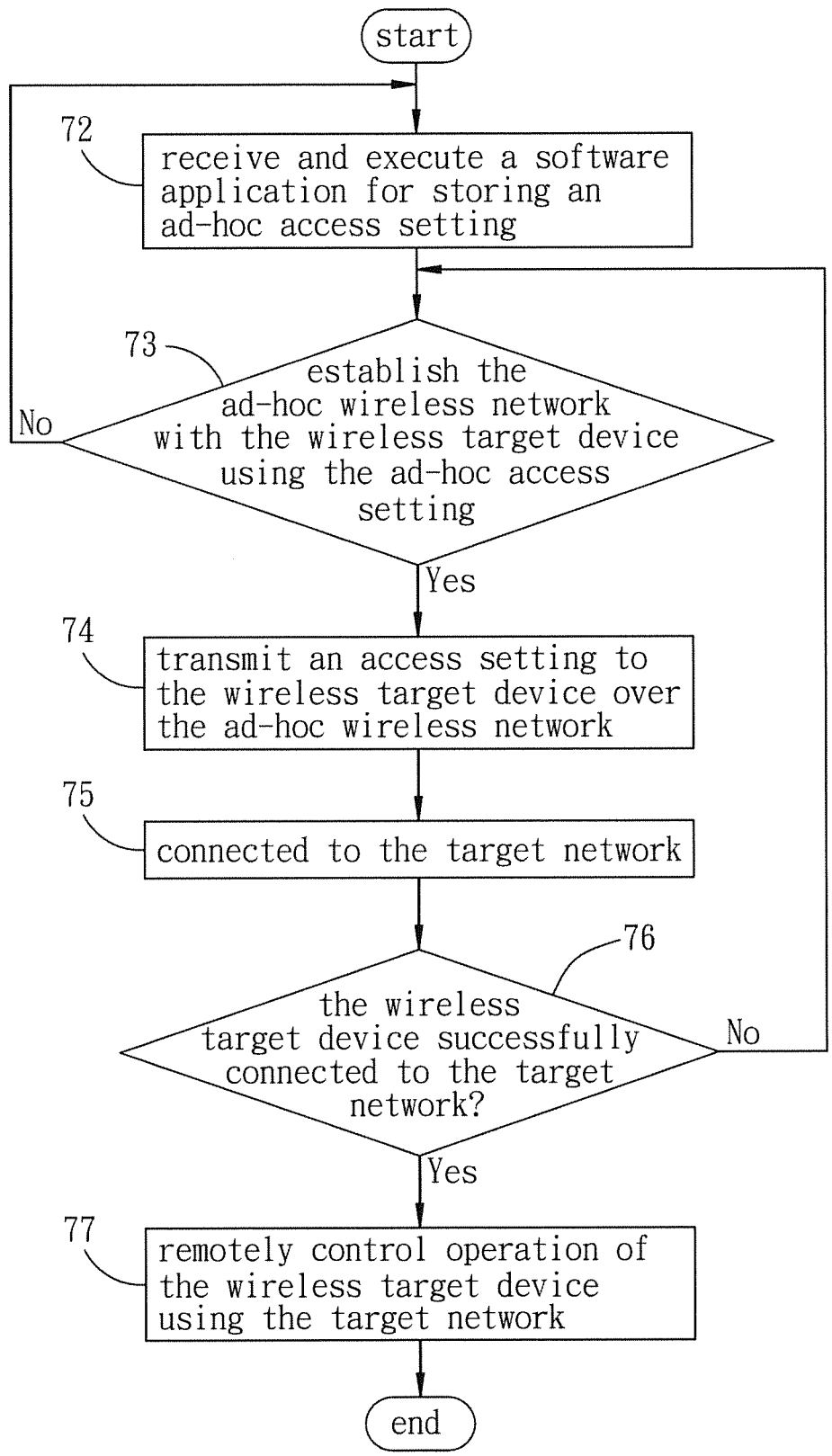
FIG. 2 is a flow chart of a method for allowing a wireless target device to automatically connect to a target network, according to the present invention.

Further referring to FIG. 2, the wireless network system 100 is configured to perform a method in accordance with this embodiment, for allowing the wireless target device 3 to automatically connect to the target network.

In step 72, the wireless executing device 2 is operable to receive and execute a software application that includes instructions for storing an ad-hoc access setting in the wireless executing device 2. The software application can be received from a physical storage medium such as an optical disk or a flash drive, and/or from the Internet through the target network. In other embodiments, the software application can be stored in the wireless executing device 2 in advance.

At least a part of the ad-hoc access setting conforms with a built-in device identifier of the wireless target device 3. In this embodiment, the built-in device identifier of the wireless target device 3 includes an identical SSID and channel information for establishing the ad-hoc wireless network, and the ad-hoc access setting from the software application stored in the wireless executing device 2 includes the same SSID and channel information for establishing the ad-hoc wireless network with the wireless target device 3. The channel information (e.g. Channel Number) is for the wireless executing device 2 to establish the ad-hoc wireless network with the wireless target device 3 using one of a primary channel and a secondary channel as a communication channel. More than one channel can be switched to be employed as the communication channel in case that the current communication channel has unacceptable interference. In some embodiments, for security reasons, the built-in device identifier of the wireless target device 3 and a part of the ad-hoc access setting stored in the software application may also include security information for verifying the wireless target device 3.

In step 73, the wireless executing device 2 is operable to establish the ad-hoc wireless network with the wireless target device 3 using the ad-hoc access setting. In this embodiment, the information needed for establishing the ad-hoc wireless network, including the SSID and channel information, are stored in both the wireless executing device 2 and the wireless target device 3 before this step, such that the ad-hoc wireless network can be automatically established. The operation regarding establishment of the ad-hoc wireless network shall be described in detail later. When the ad-hoc wireless network is successfully established, the flow proceeds to step 74. Otherwise, the ad-hoc access setting may be incorrect, and the flow goes back to step 72. In other embodiments, the method is terminated.

In step 74, the wireless executing device 2 is operable to transmit an access setting to the wireless target device 3 over the ad-hoc wireless network. The access setting enables the wireless target device 3 to connect to the target network.

Specifically, the wireless service providing device 1 is stored with authentication information, such as an SSID and an associated password. In order for a wireless device to be granted access to the target network, the corresponding authentication information must be provided to the wireless service providing device 1. That is, the access setting transmitted by the wireless executing device 2 must conform with the authentication information stored in the wireless service providing device 1, such that the wireless target device 3 is able to provide the wireless service providing device 1 with the required authentication information, and subsequently the wireless service providing device 1 may allow the wireless target device 3 to connect to the target network.

Afterward, the wireless executing device 2 is operable to be connected to the target network in step 75, and to determine whether the wireless target device 3 has successfully connected to the target network in step 76. The operation of step 76 can be executed by the wireless executing device 2 using simple service discovery protocol (SSDP). When the determination made in step 76 is affirmative, the flow proceeds to step 77. Otherwise, the flow goes back to step 73 to retry connection.

In step 77, the wireless executing device 2 is operable, by virtue of the software application, to remotely control operation of the wireless target device 3 using the target network. For example, when a wireless speaker is implemented as the wireless target device 3 in this embodiment, output volume of the wireless target device 3 can be tuned using the wireless executing device 2. Then, the method for allowing the wireless target device 3 to automatically connect to the target network may be terminated, and the wireless target device 3 stays connected to the target network thereafter.

In this way, since the wireless target device 3 is now stored with the access setting, the next time that it is desired to connect the wireless target device 3 to the target network, the wireless executing device 2 may instruct the wireless target device 3 to attempt connecting to the target network without transmitting the access setting anew.

Figure 3:
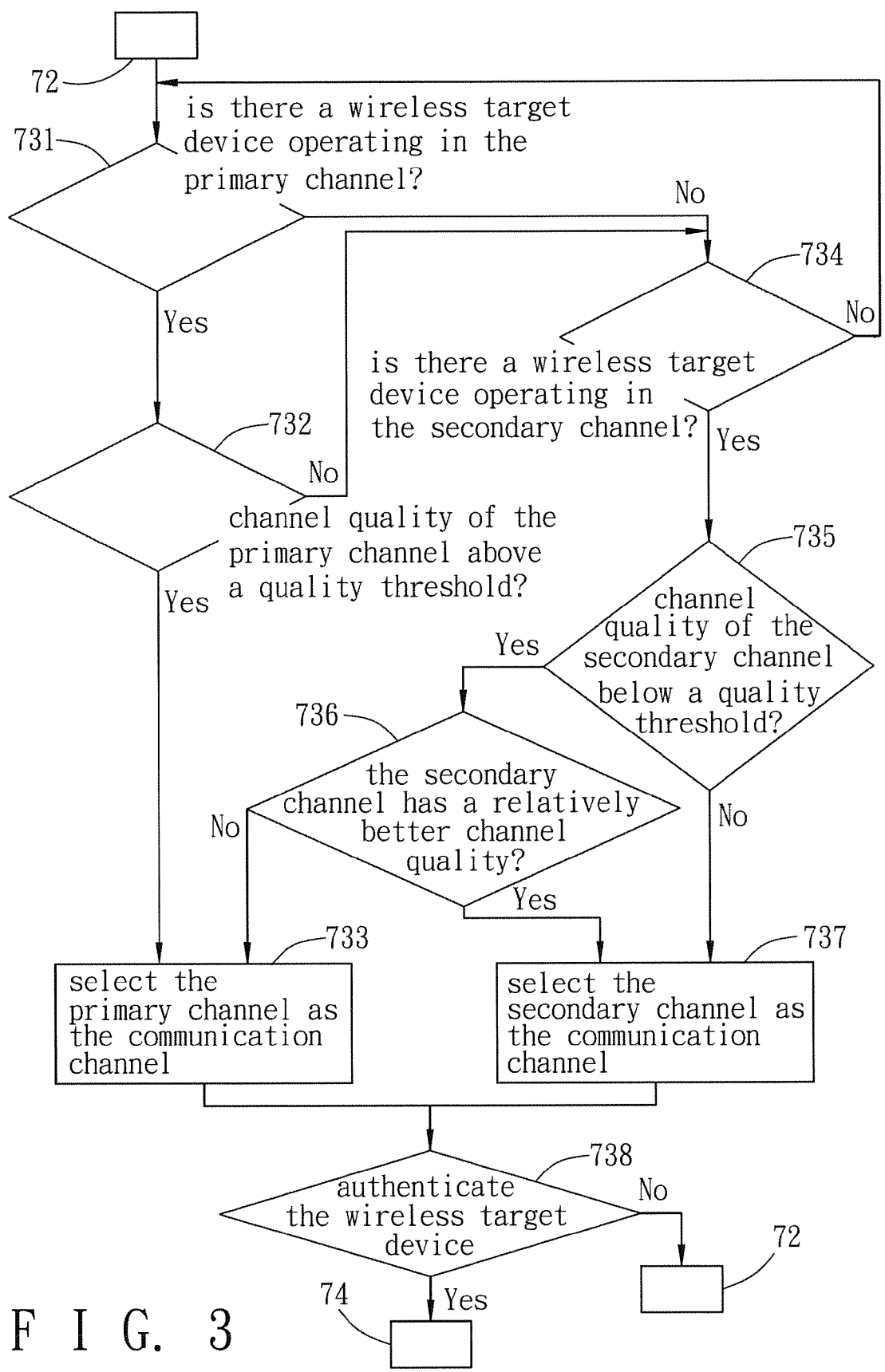
FIG. 3 is a flow chart illustrating sub-steps of a step of the method where a wireless executing device establishes an ad-hoc wireless network with a wireless target device.

FIG. 3 illustrates the sub-steps of step 73, in which the ad-hoc wireless network is established between the wireless executing device 2 and the wireless target device 3. It is noted that at the instance of step 73, the wireless executing device 2 has received and executed the software application.

Each of the wireless target devices 3 is this stage attempts to establish connection by broadcasting its SSID. In sub-step 731, the wireless executing device 2 is operable to first switch to the primary channel, and to broadcast the SSID included in the ad-hoc access setting to search for the wireless target device 3 having the same SSID and operating in the primary channel in a nearby location. It is noted that the wireless executing device 2 also can be operable to first switch to the secondary channel depends on the software application design. When such a wireless target device 3 is found, the flow proceeds to sub-step 732. Otherwise, the flow proceeds to sub-step 734.

In sub-step 732, the wireless executing device 2 is operable to evaluate a channel quality of the primary channel. For example, when the channel quality of the primary channel is deemed to be above a quality threshold by the wireless executing device 2, the flow proceeds to sub-step 733, in which the wireless executing device 2 selects the primary channel as the communication channel, and the flow proceeds to sub-step 738. Otherwise, the flow proceeds to sub-step 734, in which the wireless executing device 2 is operable to switch to the secondary channel and to search for the wireless target device 3 having the same SSID and operating in the secondary channel in a nearby location.

The operation in sub-step 734 is similar to that in sub-step 731, the object of sub-step 734 being to search for the wireless target device 3 having the same SSID and operating in the secondary channel in a nearby location. When such a wireless target device 3 is found, the flow proceeds to sub-step 735. Otherwise, the flow goes back to sub-step 731.

In sub-step 735, the wireless executing device 2 is operable to evaluate a channel quality of the secondary channel. When the channel quality of the secondary channel is deemed to be below the quality threshold by the wireless executing device 2, the flow proceeds to sub-step 736, in which the wireless executing device 2 compares the channel qualities of the primary channel and the secondary channel. Otherwise, the flow proceeds to sub-step 737, in which the wireless executing device 2 selects the secondary channel as the communication channel, and the flow proceeds to sub-step 738.

When it is determined by the wireless executing device 2, in sub-step 736, that the primary channel has a relatively better channel quality, the flow goes to sub-step 733. Otherwise, the flow proceeds to sub-step 737.

In sub-step 738, the wireless executing device 2 is operable to authenticate the wireless target device 3. When the authentication is successful, the flow proceeds to step 74. Otherwise, the ad-hoc access setting may be incorrect, and the flow goes back to step 72. In other embodiments, the method is terminated.

Two methods of authentication may be used in this instance, namely the open system authentication and the shared-key authentication, as readily appreciated by those skilled in the art. When connection between the wireless executing device 2 and the wireless target device 3 using the primary channel is broken, the wireless executing device 2 may try establishing connection with the wireless target device 3 using the secondary channel. In the same manner, when connection between the wireless executing device 2 and the wireless target device 3 using the secondary channel is broken, the wireless executing device 2 may try establishing connection with the wireless target device 3 using the primary channel.

In general, when it is desired to connect the wireless target device 3 that has no input interface to the target network, a user is only required to download the software application that includes the ad-hoc access setting to the wireless executing device 2, and the ad-hoc wireless network between the wireless executing device 2 and the wireless target device 3 can be automatically established. The user may then provide the access setting, which is required to connect to the target network, to the wireless executing device 2 for transmission to the wireless target device 3 over the ad-hoc wireless network. As a result, the method in accordance with this embodiment grants the wireless target device 3 automatic network setting capability.

Referring back to FIG. 1, the wireless executing device 2 in this embodiment includes a transceiver unit 21 for wireless transmission (which includes receiving the ad-hoc access setting), a connecting unit 22 for connecting wireless executing device 2 to the target network and/or the ad-hoc wireless network, and a processor unit 23. The wireless target device 3 includes a transceiver unit 31 for receiving the access setting wirelessly transmitted by the wireless executing device 2, and a connecting unit 32 that is configured to connect the wireless target device 3 to the ad-hoc wireless network and/or the target network using the access setting received from the wireless executing device 2. After the wireless target device 3 has successfully connected to the target network, the wireless executing device 2 is operable to remotely control operation of the wireless target device 3 using the processor unit 23.

It is noted that when the access setting (e.g., the SSID and/or the authentication password) provided by the wireless service providing device 1 for connecting to the target network is changed, the user of the wireless executing device 2 may execute for updating to the latest access setting.

Furthermore, in some embodiments where the wireless target device 3 is provided with one network interface (i.e., is not able to connect to multiple networks simultaneously), the wireless target device 3 may be configured to alternate connection between the target network and the ad-hoc wireless network. Specifically, after connection with the target network is established, the connecting unit 32 periodically transmits a detecting packet for verifying connection status with the target network. When it is detected that the connection with the target network is lost, the connecting unit 32 connects to the ad-hoc wireless network, and may attempt to reconnect the wireless target device 3 to the target network periodically. For example, the connecting unit 32 may request the access setting from the wireless executing device 2 through the ad-hoc wireless network, or notify the user of the wireless executing device 2 to initiate execution of the above method. This configuration may also apply to the cases where the access setting is changed.

Figure 4:
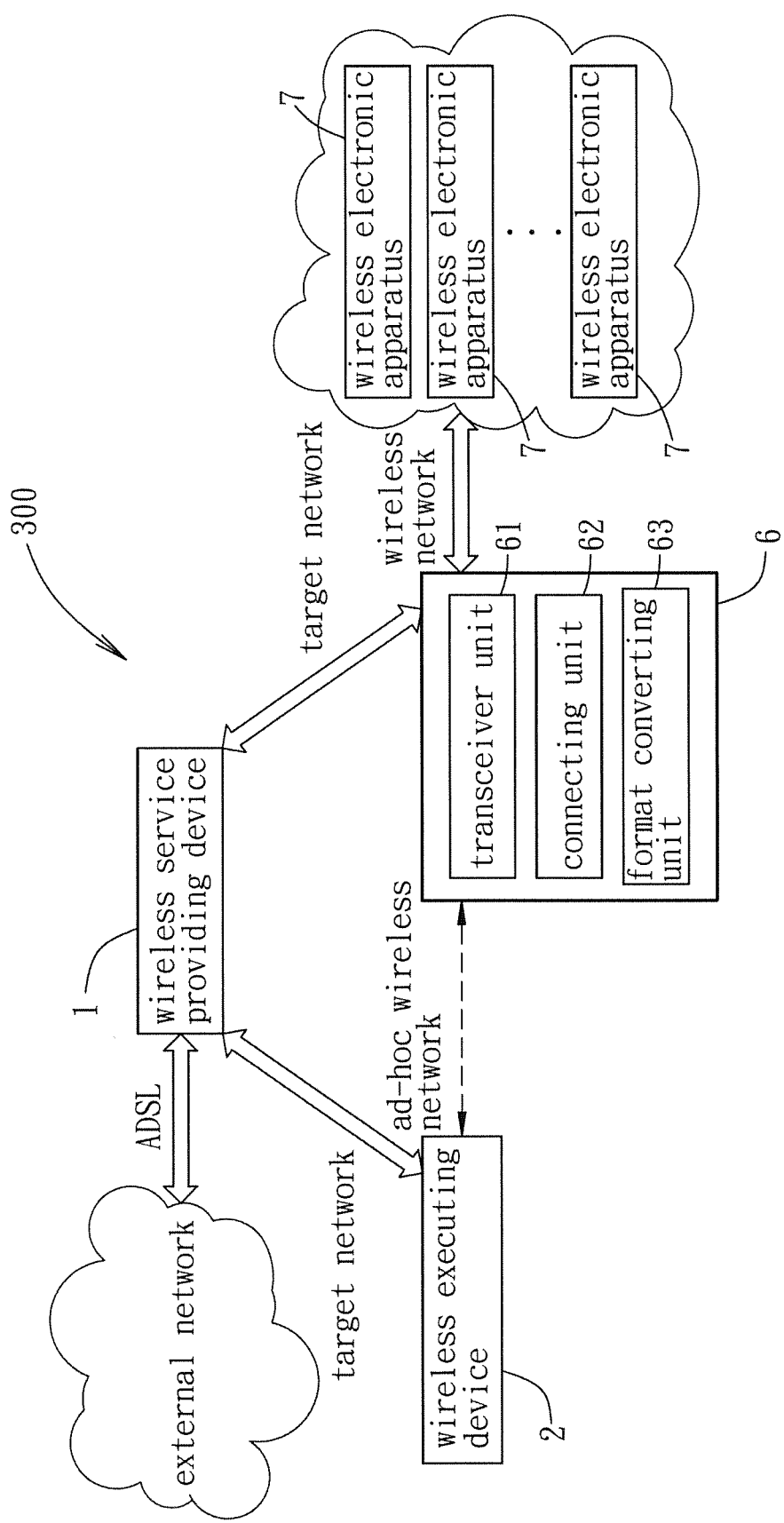
FIG. 4 is a schematic block diagram of a wireless network system according to a second preferred embodiment of the present invention.

As shown in FIG. 4, a wireless network system 300 according to the second preferred embodiment of the present invention has a structure similar to that of the first embodiment. The main difference between this embodiment and the previous embodiment resides in the configuration of a wireless target device 6 and a plurality of wireless electronic apparatuses 7. In this embodiment, the wireless target device 6 and the wireless electronic apparatuses 7 are configured to communicate over a wireless network. The wireless target device 6 includes a transceiver unit 61, a connecting unit 62 that is configured to connect to the target network, ad-hoc wireless network and the wireless network, and a format converting unit 63.

In this embodiment, the protocol used by the wireless network is different from that by the target network and ad-hoc wireless network. As a result, the wireless target device 6 cannot directly relay data from one of the wireless service providing device 1, wireless executing device 2 and the wireless electronic apparatuses 7 to the other one. Therefore, an input communication signal from an arbitrary one of the wireless executing device 2, the wireless service providing device 1, and the wireless electronic apparatuses 7 can be received by the connecting unit 62, and subsequently transmitted to the format converting unit 63 for generating an output communication signal accordingly. The output communication signal is then transmitted by the connecting unit 62 to a destination one of the wireless executing device 2, the wireless service providing device 1 and the wireless electronic apparatuses 7. Specifically, the converting unit 63 is operable to perform a format conversion to the input communication signal, in order to generate the output communication signal which can be readable to any one of the wireless executing device 2, the wireless service providing device 1, and the wireless electronic apparatuses 7.

In this embodiment, the wireless network conforms with the ZigBee specification. The wireless electronic apparatuses 7 may be a wireless lighting switch, air conditioner, wireless speaker or the like, and are configured to have ZigBee transceiving functionality. The wireless target device 6 is a network connector configured to have both Wi-Fi and ZigBee transceiving functionalities. The wireless executing device 2 is similarly operable to remotely control operation of the wireless electronic apparatuses 7 via the wireless target device 6, when the network connections of the wireless target device 6 and the wireless electronic apparatuses 7 are successfully established. The wireless network may also be using Bluetooth technology, and the wireless service providing device 1, the wireless executing device 2 and the wireless target device 6 may also be configured to have Bluetooth transceiving functionality.

The second preferred embodiment has the same advantages as those of the first preferred embodiment.

Figure 5:
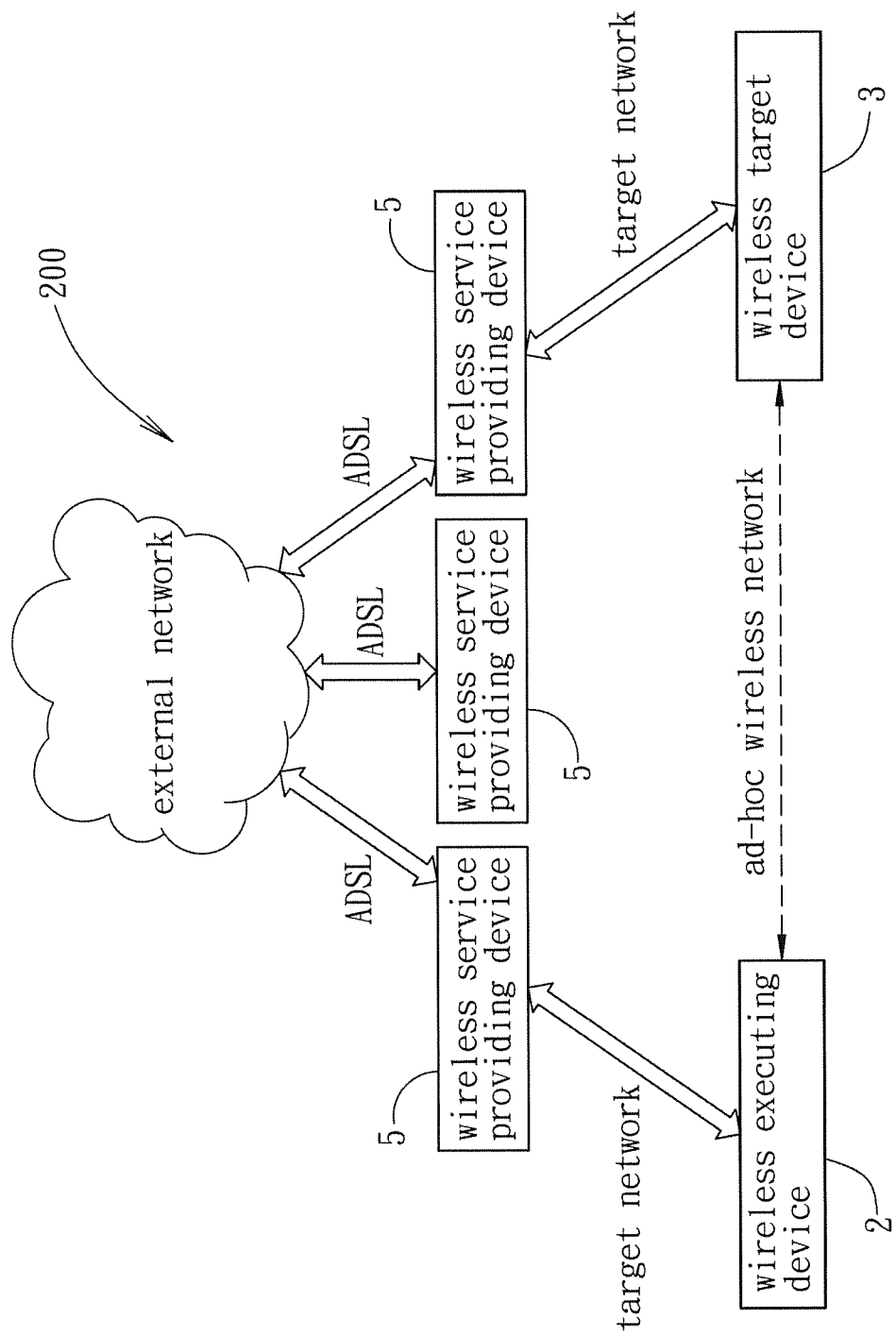
FIG. 5 is a schematic block diagram of a wireless network system according to a third preferred embodiment of the present invention.

As shown in FIG. 5, a wireless network system 200 according to the third preferred embodiment of the present invention has a structure similar to that of the first embodiment. The main difference between this embodiment and the first preferred embodiment resides in that, the wireless network system 200 comprises a plurality of wireless service providing devices 5, three of which are shown in FIG. 5. Each of the wireless service providing devices 5 is configured to provide a distinct target network. The wireless executing device 2 is configured to store a plurality of access settings, each enabling connection with one o f the target networks. The wireless executing device 2 is operable to transmit a selected one of the access settings to the wireless target device 3 through the ad-hoc wireless network. Specifically, the wireless executing device 2 is operable to display the available access settings for the user to select, and/or operable to allow the user to manually input the access settings through the input interface of the wireless executing device 2.

The third preferred embodiment has the same advantages as those of the first preferred embodiment.

Figure 6:
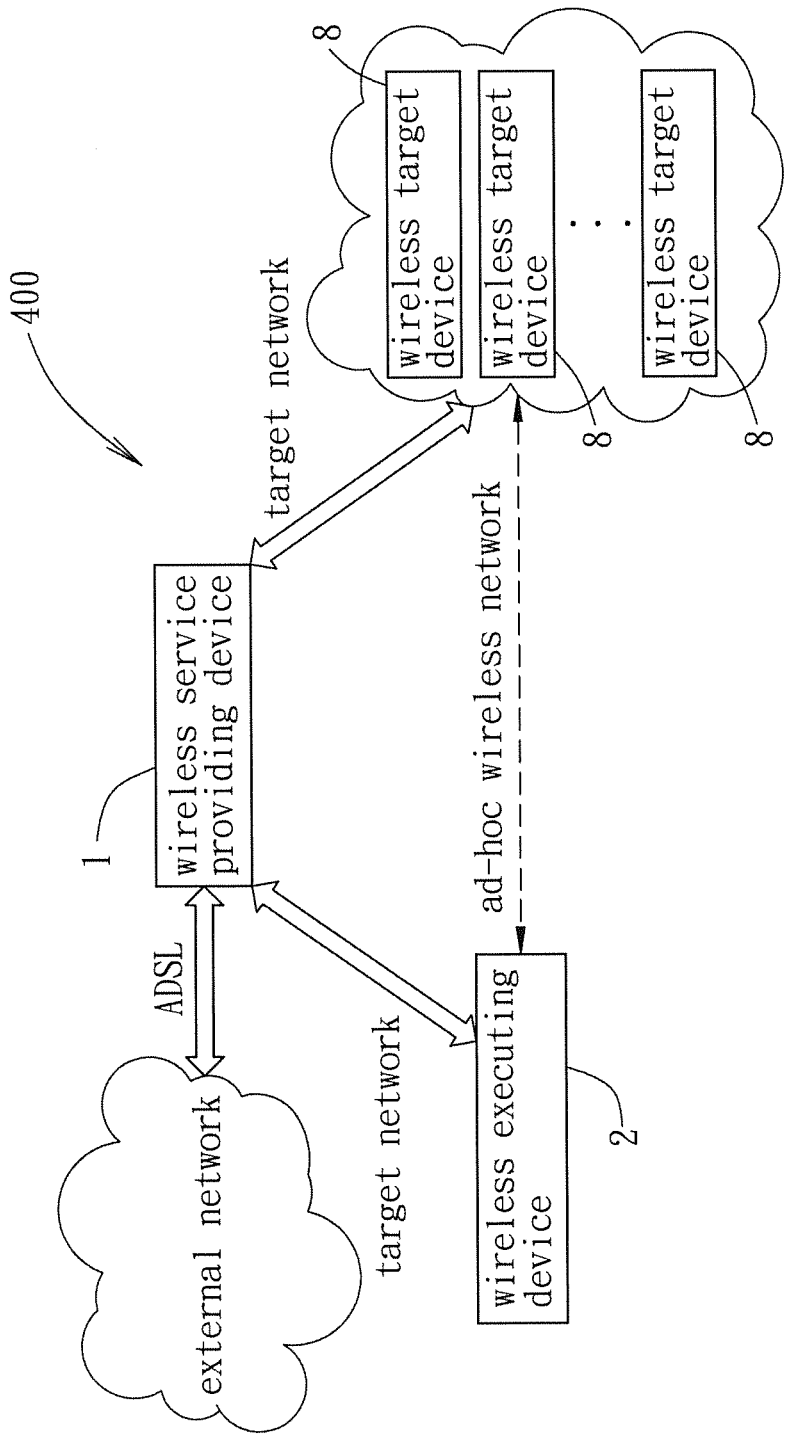
FIG. 6 is a schematic block diagram of a wireless network system according to a fourth preferred embodiment of the present invention.

As shown in FIG. 6, a wireless network system 400 according to the fourth preferred embodiment of the present invention has a structure similar to that of the first embodiment. The main difference between this embodiment and the first embodiment resides in that the wireless network system 400 comprises a plurality of wireless target devices 8. Each of the wireless target devices 8 is similar to that employed in the first embodiment, but the built-in device identifier of each of the wireless target devices 8 further includes a unique media access control (MAC) address, and the ad-hoc access setting includes the MAC address of each of the wireless target devices 8. With the MAC addresses, the wireless executing device 2 via the software application is operable to identify each of the wireless target devices 8, and to transmit the access setting to some, or all of the wireless target devices 8. Each of the wireless target devices 8 is configured to transmit to the wireless executing device 2 a status response for indicating receipt of the access setting therefrom.

In operation, the software application provides the user with a setting interface on the wireless executing device 2. On the setting interface, all the operational wireless target devices 8 and the corresponding status (e.g., receipt of the access setting, connection with the wireless executing device 2, connection with the target network, etc.) are displayed, such that the user may readily acknowledge and manage the wireless target devices 8. Additionally, the setting interface provides the user with the option to connect the wireless target devices 8 individually or concurrently. For example, the setting interface may include a "connect all devices" option for the wireless executing device 2 to connect the wireless target devices 8 to the target network simultaneously.

To sum up, the wireless network system, target device and method in accordance with the disclosed embodiments have a number of advantages, including:

1. The wireless executing device 2 is configured to establish the ad-hoc wireless network with the wireless target device 3, 6 and 8, and to transmit the access setting to the wireless target device 3, 6 and 8 over the ad-hoc wireless network for connecting to the target network automatically. Thus, the wireless executing device 2 can be operable to remotely control operation of the wireless target device 3, 6 and 8 through the target network. Moreover, this configuration eliminates the requirement that the wireless target device 3, 6 and 8 are provided with an input interface for receiving the access setting from the user manually and is thus able to reduce the manufacturing cost of the wireless target device 3, 6 and 8;

2. The wireless network system can be extended to comprise extra wireless electronic apparatuses 7, and can be managed conveniently using the setting interface provided on the wireless executing device 2 via the wireless target devices 3, 6 and 8 (as shown in FIG. 4, for example); and 3. The detailed ad-hoc access setting to establish the ad-hoc wireless network is provided by the software application, such that the user may be able to connect the wireless target device 3, 6 and 8 to the target network using the wireless executing device 2 without being familiar with the setting and operation of the wireless network system.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for enabling a wireless target device to automatically connect directly to a target network, the method to be implemented by a wireless executing device and comprising:
   (a) receiving, by the wireless executing device, an ad-hoc access setting, at least a part of the ad-hoc access setting conforming with a built-in device identifier of the wireless target device, the ad-hoc access setting also including channel information, the channel information built into the wireless target device;
   (b) establishing, by the wireless executing device, an ad-hoc wireless connection with the wireless target device through one of a primary channel and a secondary channel as a communication channel, using the ad-hoc access setting; and
   (c) transmitting, by the wireless executing device, an access setting to the wireless target device over the ad-hoc wireless connection, the access setting enabling the wireless target device to connect directly to the target network, wherein operation (b) includes the sub-operations of:
(1) when it is determined that the wireless target device currently operates in the primary channel, selecting, by the wireless executing device, the primary channel as the communication channel, and evaluating, by the wireless executing device, a channel quality of the primary channel, and
(2) selecting, by the wireless executing device, the secondary channel as the communication channel when either the wireless target device is absent in the primary channel, or the channel quality of the primary channel is deemed by the wireless executing device to be below a quality threshold.

2. The method of claim 1, wherein, in operation (a), the wireless executing device receives and executes a software application that includes instructions for storing the ad-hoc access setting in the wireless executing device and instructions for causing the wireless executing device to perform operations (b) and (c).

3. The method of claim 1, wherein the device identifier of the wireless target device includes a service set identifier (SSID), and the ad-hoc access setting includes the SSID that conforms to that of the wireless target device.

4. The method of claim 1, further comprising, after operation (c), remotely controlling, by the wireless executing device, operation of the wireless target device that is connected to the target network, using the target network.

5. A wireless network system with automatic network setting capability, the wireless network system comprising:
a first wireless service providing device for providing access to a first target network;
a wireless executing device operable to connect to the first target network; and
a wireless target device operable to establish an ad-hoc wireless connection with the wireless executing device;
wherein the wireless executing device is configured to transmit a first access setting to the wireless target device over the ad-hoc wireless connection, the first access setting enabling the wireless target device to automatically connect directly to the first target network,
wherein the wireless target device has a built-in device identifier and built-in channel information, the wireless executing device is stored with an ad-hoc access setting, at least a part of the ad-hoc access setting conforms with the built-in device identifier of the wireless target device, the ad-hoc access setting also including the channel information of the wireless target device, and
wherein the wireless executing device is configured to establish the ad-hoc wireless connection with the wireless target device through one of a primary channel and a secondary channel as a communication channel, using the ad-hoc access setting, the establishment of the connection including:
when it is determined that the wireless target device currently operates in the primary channel, selecting the primary channel as the communication channel, and evaluating a channel quality of the primary channel, and
selecting the secondary channel as the communication channel when either the wireless target device is absent in the primary channel, or the channel quality of the primary channel is deemed by the wireless executing device to be below a quality threshold.

6. The wireless network system of claim 5, wherein the wireless executing device is loaded with a software application that includes instructions for storing the ad-hoc access setting in the wireless executing device and instructions for causing the wireless executing device to establish the ad-hoc wireless connection with the wireless target device and to transmit the first access setting to the wireless target device through the ad-hoc wireless connection.

7. The wireless network system of claim 5, wherein the device identifier of the wireless target device includes a service set identifier (SSID), and the ad-hoc access setting includes the SSID that conforms to that of the wireless target device.

8. The wireless network system of claim 5, wherein the first target network provided by the first wireless service providing device conforms to wireless fidelity (Wi-Fi) certification.

9. The wireless network system of claim 5, further comprising a wireless electronic apparatus operable to connect to a wireless network, wherein the wireless target device is configured to:
communicate with the wireless electronic apparatus using the wireless network;
receive, from a source device, an input communication signal, the source device being one of the wireless executing device, the first wireless service providing device, and the wireless electronic apparatus; and
transmit, to a destination device, an output communication signal that is generated based on the input communication signal, the destination device being one of the wireless executing device, the first wireless service providing device and the wireless electronic apparatus.

10. The wireless network system of claim 9, wherein the wireless network conforms to ZigBee specification.

11. The wireless network system of claim 5, further comprising a second wireless service providing device for providing a second target network, wherein the wireless executing device is configured to transmit a selected one of the first access setting and a second access setting to the wireless target device through the ad-hoc wireless connection, the second access setting enabling the wireless target device to connect directly to the second target network.

12. The wireless network system of claim 5, further comprising a plurality of the wireless target devices, each of which has a built-in device identifier, the wireless executing device being stored with an ad-hoc access setting, at least a part of the ad-hoc access setting conforming with the built-in device identifiers of the wireless target devices, the wireless executing device being configured to transmit the first access setting to the wireless target devices, each of the wireless target devices being configured to transmit to the wireless executing device a status response for indicating receipt of the first access setting therefrom.

13. The wireless network system of claim 12, wherein the device identifier of each of the wireless target devices includes a unique media access control (MAC) address, and the ad-hoc access setting includes the MAC address of each of the wireless target devices.

14. A wireless target device for use in a wireless network system with automatic network setting capability, the wireless network system including the wireless target device, a wireless service providing device for providing access to a target network, and a wireless executing device that is operable to connect to the target network, the wireless target device comprising:
a transceiver unit for receiving an access setting wirelessly transmitted by the wireless executing device over an ad-hoc wireless connection; and a connecting unit configured to:
    establish the ad-hoc wireless connection with the wireless executing device when at least part of an ad-hoc access setting being used by the wireless executing device conforms with a built-in device identifier of the wireless target device, and
    connect directly to the target network using the access setting received from the wireless executing device,
wherein the ad-hoc access setting further includes channel information for the wireless executing device to establish the ad-hoc wireless network connection with the wireless target device using one of a primary channel and a secondary channel as a communication channel, the channel information also built into the wireless target device, such that:
    when it is determined that the wireless target device currently operates in the primary channel, the wireless executing device selects the primary channel as the communication channel, and evaluates a channel quality of the primary channel, and
    the wireless executing device selects the secondary channel as the communication channel when either the wireless target device is absent in the primary channel, or the channel quality of the primary channel is deemed by the wireless executing device to be below a quality threshold.

15. The wireless target device of claim 14, wherein the built-in device identifier includes a service set identifier (SSID).

16. The wireless target device of claim 14, the wireless network system further including a wireless electronic apparatus operable to connect to a wireless network, the wireless target device further comprising a format conversion unit, the connecting unit being further configured to:
    communicate with the wireless electronic apparatus using the wireless network;
    receive, from a source device, an input communication signal, the source device being one of the wireless executing device, the wireless service providing device, and the wireless electronic apparatus; and
    transmit, to a destination device, an output communication signal that is generated by the format conversion unit based on the input communication signal, the destination device being one of the wireless executing device, the wireless service providing device, and the wireless electronic apparatus.

* * * * *